United States Patent [19]

Hattori

[11] Patent Number: 4,792,109
[45] Date of Patent: Dec. 20, 1988

[54] HOSE INTERMEDIATE RETAINER
[75] Inventor: Masato Hattori, Nagoya, Japan
[73] Assignee: Toyoda Gosei Co., Ltd., Nishikasugai, Japan
[21] Appl. No.: 112,442
[22] Filed: Oct. 26, 1987
[30] Foreign Application Priority Data
 Oct. 28, 1986 [JP] Japan ................. 61-165480
[51] Int. Cl.⁴ ............................... F16L 5/00
[52] U.S. Cl. .......................... 248/56; 285/61; 285/256
[58] Field of Search ............... 285/256, 254, 382, 61; 248/56
[56] References Cited
U.S. PATENT DOCUMENTS
 2,147,356 2/1939 Scholtes ..................... 285/256
 3,378,282 4/1968 Demler ..................... 285/382 X
 4,305,608 12/1981 Stuemky ................... 285/256
 4,674,719 6/1987 Tonioka et al. ............ 285/256 X FOREIGN PATENT DOCUMENTS
 1528530 10/1978 United Kingdom ........ 285/256
 59-6310 2/1984 Japan .

Primary Examiner—Dave W. Arola
Attorney, Agent, or Firm—Cushman, Darby & Cushman

[57] ABSTRACT

The hose intermediate retainer comprises a tubular member having a flange-shaped portion, a ringlike groove and a plurality of vertical grooves (flutes). The vertical grooves (flutes) extend in the axial direction at circumferentially fixed intervals to an outer peripheral surface or an inner peripheral surface of the tubular member. With the hose inserted into the center hole of the tubular member, the tubular member is caulked (i.e., squeeze-formed) from all directions, with the result that the diameter of the center hole becomes sufficiently small and thus the hose is fixedly held by the retainer.

6 Claims, 2 Drawing Sheets

FIG. 7
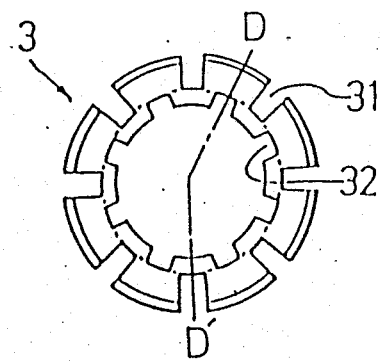
FIG. 8
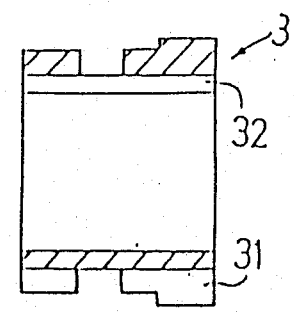
FIG. 9 (PRIOR ART)
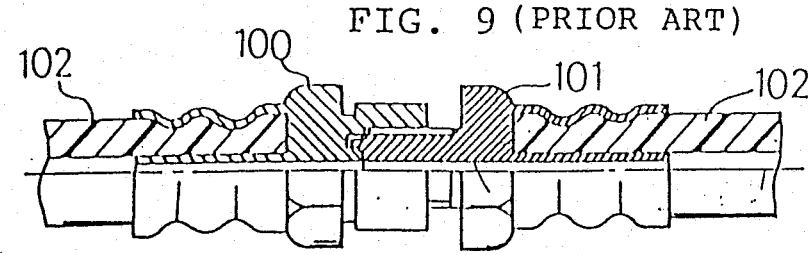
FIG. 10 (PRIOR ART)
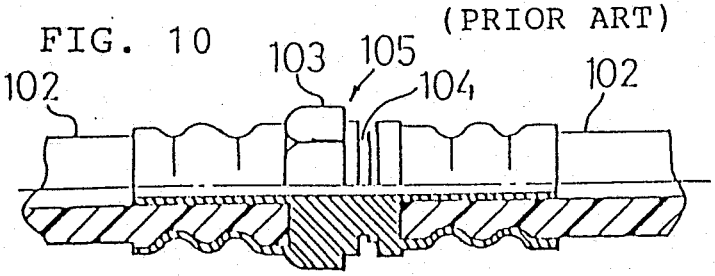
FIG. 11 (PRIOT ART)
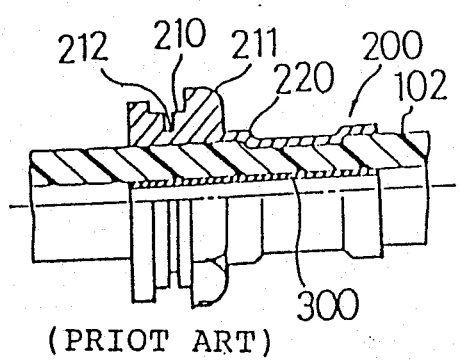
FIG. 12 (PRIOR ART)
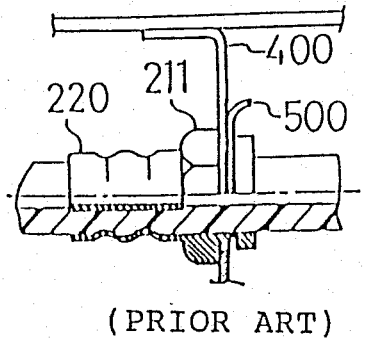

HOSE INTERMEDIATE RETAINER

BACKGROUND OF THE INVENTION

1. Field of the Invention

The present invention relates to a hose intermediate retainer which receives the intermediate portion of a hose for preventing it from loosening or contacting other parts when piping.

2. Description of the Prior Art

A type of hose intermediate retainer known in the prior art, as shown in FIG. 9, comprises a pair of metal parts 100 and 101 which can be coupled by means of threads or fittings. Each hose 102 is inserted between the nipple and sleeve of the metal part 100 or 101, and then joined therewith by way of caulking (i.e., squeeze-forming such as crimping). After these processes, metal parts 100 and 101 are coupled together by means of threads or fittings, and the coupled portion is retained by a clamp or the like to be suitable for mounting fixedly the hose intermediate retainer on some other parts.

Another known type of hose intermediate retainer is shown in FIG. 10. This known retainer has a securing portion 105 comprising a central flange 103 which functions as a stopper when the retainer is inserted into a through hole of a mounting bracket or the like and a clip groove 104 into which a spring clip for fixing can be inserted, and two pairs of nipples and sleeves which extend in both directions from the securing portion 105. Each hose 102 is placed in the nipple and sleeve and fixed thereto by way of caulking (i.e., squeeze-forming). This retainer is fixed to other parts by firmly holding the securing portion 105 with a clip, clamp, etc.

The hose intermediate retainers in these prior art constructions, however, have problems in that they require a number of parts to construct and have a very complicated configuration.

Furthermore, with the aforementioned known retainers, they have fairly a long overall length in an axial direction to ensure their good function, and, because of this long length, there is a certain possibility of reducing flexibility of the hose.

In view of the disadvantages mentioned above, a different hose intermediate retainer has been proposed and disclosed in Japanese Examined Utility Model Publication (KOKOKU) No. 6310/1984.

This newly proposed hose intermediate retainer, as shown in FIGS. 11 and 12, comprises an outer cylindrical member 200 and an inner cylindrical member 300. The outer cylindrical member 200 comprises a securing portion 210 having a clip groove 212 for inserting a spring clip 500 for fixing and a flange 211 formed over the outer peripheral surface, and a deformable cylindrical part 220 which extends from the securing portion 210 to either the left or right side in an axial direction. Meanwhile, the inner cylindrical member 300 is coaxially placed in the outer cylindrical member 200 in such a manner as to allow a hose 102 to be inserted therebetween. After inserting the hose 102, the deformable cylindrical part 220 of the outer cylindrical member 200 is caulked (i.e. squeeze-formed) and thereby deformed sufficiently so that the hose 102 is firmly held between the inner and outer cylindrical members 200, 300. The flange 211 is adapted to abut against a mounting bracket 400 and function as a stopper when the retainer has been inserted into a through hole of the mounting bracket 400.

In the case of the last-mentioned hose intermediate retainer, too, it has a considerably, great overall length, which affects very much the flexibility of the hose. In other words, the hose becomes less flexible, in particular, at the securing portions.

SUMMARY OF THE INVENTION

It is an object of the present invention to provide a hose intermediate retainer of which the overall length is maintained as short as possible to ensure a sufficient flexibility of the hose.

It is another object of the present invention to provide a hose intermediate retainer which is can be assembled using a decreased number of parts.

it is a further object of the present invention to provide a hose intermediate retainer which is able to be easily attached to a mounting bracket for some other parts.

Briefly, these objects and other objects of the present invention will become more readily apparent from the detailed description as set forth hereinafter.

The hose intermediate retainer in the present invention comprises a tubular member having a flange-shaped portion formed over one outer peripheral end surface in the axial direction, a ring-shaped groove over outer peripheral center in the axial direction and a plurality of vertical grooves which extend in the axial direction at circumferentially fixed intervals either at least to the outer peripheral surface or the inner peripheral surface. With this construction, the hose intermediate retainer in the present invention features that, after inserting the hose into the hose intermediate retainer, the tubular member configured as mentioned above is caulked (i.e., squeeze-formed) in a radial direction for fixing the retainer to the outer peripheral surface of the hose. The flange-shaped portion mentioned above functions as a stop means upon insertion of the retainer into the hole of a mounting bracket. The ring-shaped groove is provided to place therein a spring clip for fixing or the like. The hose intermediate retainer of the present invention has a plurality of vertical grooves which extend in the axial direction at circumferentially fixed intervals to either at least the inner or outer peripheral surface. That is, portions having these vertical grooves have a thinner wall thickness. Accordingly, when caulking (i.e., squeeze-forming) radially after having placed the hose in the retainer, the vertical grooves come to be deformed, with the result that the diameter of the center hole becomes sufficiently small and thus the hose is fixedly held firmly by the retainer. These vertical grooves may be provided on either of the outer and inner peripheral surfaces, and in some cases, may be provided on both peripheral surfaces.

The number, width, etc. of these vertical grooves may be selected variously in consideration of the force exerted to join the tubular member and the hose together, or materials of the retainer.

It is preferred to insert an inner cylindrical member into the center hole of the hose. The inner cylindrical member has a length approximately equal to that of the tubular member. The inner cylindrical member serves to prevent the center hole from being deformed so much when caulking (i.e., squeeze-forming), whereby the flowing channel of the fluid is maintained, and thus, a more reliable and strong joint between the hose and the retainer is ensured.

BRIEF DESCRIPTION OF THE DRAWINGS

A more complete application of the invention and many of the attendant features of preferred embodiments thereof thereof will be readily obtained as the same becomes better understood by reference to the following detailed description when considered in connection with the accompanying drawings wherein:

FIG. 7 is a side view of a third embodiment of a hose intermediate retainer according to the present invention;

FIG. 8 is a sectional view taken on line D—D' of FIG. 7;

FIG. 9 is an elevational and partly sectional view of a conventional retainer;

FIG. 10 is an elevational and partly sectional view of another conventional hose intermediate retainer;

FIG. 11 is an elevational and partly sectional view of still another conventional hose intermediate retainer; and FIG. 12 is an elevational view of the conventional hose intermediate retainer with the hose intermediate retainer fixed to a mounting portion.

DETAILED DESCRIPTION OF THE PREFERRED EMBODIMENTS

A hose intermediate retainer according to the present invention will be hereinafter explained with reference to preferred embodiments.

(First Preferred Embodiment)

Figure 1:
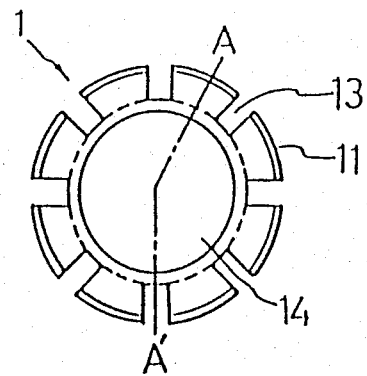
FIG. 1 is a side view of a hose intermediate retainer according to the present invention.
Figure 2:
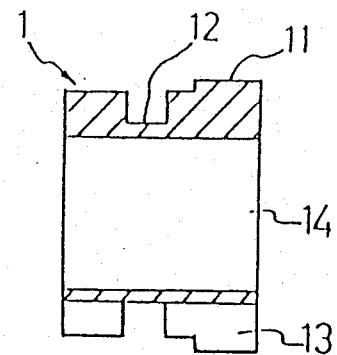
FIG. 2 is a sectional view taken on line A—A' of FIG. 1.

FIG. 1 shows a side view of a first preferred embodiment of a hose intermediate retainer according to the present invention, and FIG. 2 is a sectional view taken on line A—A' of FIG. 1.

The hose intermediate retainer 1 is made of soft steel and comprises a tubular member having a flange-shaped portion 11 formed over one outer peripheral end in the axial direction, a ring-like groove 12 formed over an outer peripheral center in the axial direction, and eight flutes 13 which extend in the axial direction at circumferentially fixed intervals to the outer peripheral surface.

Figure 3:
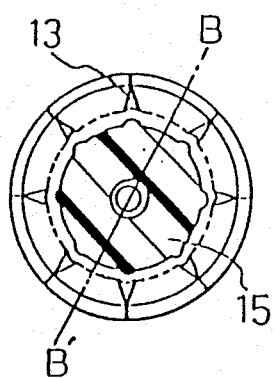
FIG. 3 is a side view of the first embodiment of a hose intermediate retainer according to the present invention.
Figure 4:
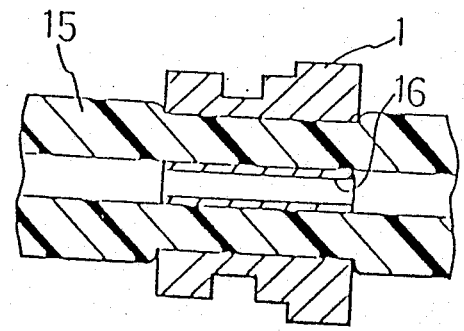
FIG. 4 is a sectional view taken on line B—B' of FIG. 3.

The hose intermediate retainer 1 has a center hole 14 into which a hose 15 is inserted. After inserting the hose 15, the peripheral surface of the retainer 1 is caulked (i.e., squeeze-formed) radially from all directions. The flutes 13, as shown in FIGS. 3 and 4, are deformed in a crushing manner, with the result that the diameter of the center hole 14 becomes small enough to fix the hose 15 thereby. When the hose intermediate retainer 1 is inserted into a through hole or the like of the bracket for other parts, the flange-shaped portion 11 abuts against the bracket and functions as a stop flange.

Then, the retainer is placed in position and fixed to other parts by inserting a clip and the like into the ring-shaped groove 12. That is, a portion of the bracket is sandwiched between the flange-shaped portion 11 and the clip in the ring-shaped groove 12. In this way, the retainer is secured fixedly without causing any play in the axial direction.

FIG. 4 shows an inner cylindrical member 16 having a length equal with that of the retainer 1, inserted into the center hole of the hose 15. In accordance with this construction, when the outer peripheral surface of the retainer 1 is caulked (i.e., squeeze-formed) from all directions, it is possible to fix more firmly the hose intermediate retainer 1 to the hose, without causing much deformation of the center hole. This results in a smoother flow of liquid in the hose through the center hole.

(Second Preferred Embodiment)

Figure 5:
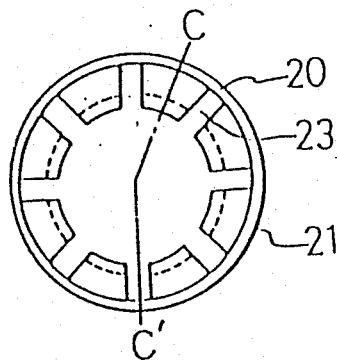
FIG. 5 is a side view of a second embodiment of a hose intermediate retainer according to the present invention.
Figure 6:
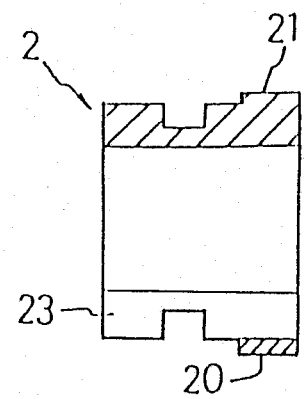
FIG. 6 is a sectional view taken on line C—C' of FIG. 5.

FIGS. 5 and 6 show a second preferred embodiment of a hose intermediate retainer 2 according to the present invention.

The construction of the second preferred embodiment is the same as that of the first preferred embodiment except that a plurality of flutes 23 which extend in the axial direction at circumferentially fixed intervals are provided on the inner peripheral surface.

In the case of this hose intermediate retainer 2 of the second preferred embodiment, when the outer peripheral surface is radially pressed from all directions, a thin cylindrical portion 20 extending over eight flutes 23 is deformed in a manner expanding outwardly, whereby the diameter of the center hole becomes small enough to fix the hose rigidly.

(Third Preferred Embodiment)

FIGS. 7 and 8 show a third preferred embodiment of a hose intermediate retainer 3, according to present invention.

The construction of the third preferred embodiment is the same as that of the first preferred embodiment except that the hose intermediate retainer 3 is provided with eight inner flutes 32 formed at circumferentially alternate positions with the outer flutes 31 at a predetermined distance. According to this third preferred embodiment, when the outer peripheral surface of the retainer 3 is pressed from all directions, all the flutes 31 and 32 are to be deformed in a well-balanced manner to make the central hole sufficiently small for fixing the hose firmly to the retainer 30.

What is claimed is:

1. A retainer for retaining an intermediate portion of a hose, comprising:
   a deformable metal tubular member having two axially opposite ends through which an axial bore thereof opens, so that said metal tubular member may be slid onto a hose to achieve a position in which some of the hose protrudes from one end of the tubular member and some of the hose protrudes from another end of the tubular member;
   a radially extending flange means provided on said tubular member so as to extend in a circumferential direction relative to the longitudinal axis of the tubular member;
   a plurality of axially extending groove means which are spaced from one another in said circumferential direction and divide said flange means into a plurality of flange segments, said tubular member thereby being caused to be radially thinner in at least some first places where said groove means are located than in at least some second places where said flange means is not broached by said groove means;

said tubular member being subject to being radially inwardly crushed by squeeze-forming deformation in said first places, thereby bringing said flange segments closer together in said circumferential direction and radially constricting said axial bore, for securing said tubular member in place on the hose; and said tubular member further including means defining an external, radially outwardly-opening circumferential groove at an intermediate location axially spaced form both of said ends of said tubular member whereby a fastener may be accommodated to said tubular member for fastening said retainer to other structure.

2. The retainer of claim 1, wherein:
all of said groove means are externally provided on said flange means so as to open radially outwards.

3. The retainer of claim 1, wherein:
all of said groove means are internally provided on said flange means so as to open radially inwards.

4. The retainer of claim 1, wherein:
alternating ones of said groove means are respectively provided externally and internally on said flange means so as to open radially outwards and radially inwards, respectively.

5. A hose having an intermediate retainer, comprising:
a metal tubular member having two axially opposite ends through which an axial bore opens;
a hose, said tubular member being disposed with said hose in said axial bore so that some of the hose protrudes form one end of the tubular member and some of the hose protrudes from another end of the tubular member;
a radially extending flange means provided on said tubular member so as to extend in a circumferential direction relative to the longitudinal axis of the tubular member;
a plurality of axially extending groove means which are spaced from one another in said circumferential direction and divide said flange means into a plurality of flange segments, said tubular member thereby being caused to be radially thinner in at least some first places where said groove means are located than in at least some second places where said flange means is not broached by said groove means;

said tubular member being radially inwardly crushed by squeeze-forming deformation in said first places, whereby said flange segments are caused to become closer together in said circumferential direction and to radially constrict said axial bore, thus securing said tubular member in place on said hose; and said tubular member further including means defining an external, radially outwardly-opening circumferential groove at an intermediate location axially spaced form both of said ends of said tubular member whereby a fastener may be accommodated to said tubular member for fastening said retainer to other structure.

6. The hose having an intermediate retainer of claim 5, further including:
an internal tube received in said hose radially inwardly of said tubular member, said hose being held squeezed radially inwardly against said internal tube by said tubular member, with said internal tube having an axial bore maintaining open communication in said hose where said hose passes through said tubular member.

* * * * *